United States Patent [19]

van Werkhoven

[11] 4,148,093
[45] Apr. 3, 1979

[54] FLASH ARRAY

[75] Inventor: Jan van Werkhoven, Eindhoven, Netherlands

[73] Assignee: U.S. Philips Corporation, New York, N.Y.

[21] Appl. No.: 701,698

[22] Filed: Jul. 1, 1976

[30] Foreign Application Priority Data

Jul. 2, 1975 [NL] Netherlands .......................... 7507856

[51] Int. Cl.² ............................................ G03B 15/02
[52] U.S. Cl. ........................................... 362/6; 362/5; 362/13
[58] Field of Search ...................... 240/1.3; 431/93, 95, 431/95 A; 362/3, 4, 5, 6, 11, 13

[56] References Cited

U.S. PATENT DOCUMENTS

| | | | |
|---|---|---|---|
| 3,458,270 | 7/1969 | Ganser et al. | 240/1.3 X |
| 3,714,407 | 1/1973 | Bowers | 240/1.3 |
| 3,935,442 | 1/1976 | Hanson | 240/1.3 |
| 3,980,876 | 9/1976 | Cote | 240/1.3 |
| 4,017,728 | 4/1977 | Audesse et al. | 362/13 |
| 4,040,777 | 8/1977 | Collins et al. | 430/95 R X |

*Primary Examiner*—Fred L. Braun
*Attorney, Agent, or Firm*—Thomas A. Broidy; Robert S. Smith

[57] ABSTRACT

A flash array has at least two combustion flash lamps and an indicator which indicates whether a lamp has or has not flashed. The indicator consists mainly of a melting strip which is constructed as a radiation-sensitive switch contact and which is part of the electric circuit of the flash array.

3 Claims, 2 Drawing Figures

FLASH ARRAY

BACKGROUND OF THE INVENTION

(1) Field of the invention

The present invention relates to a flash array provided with a laminar support on which at least two combustion flash lamps have been fitted and in which the support has, at least near one of those lamps, both a hole and a radiation-sensitive indicator of the visual kind indicating whether that lamp has or has not flashed, the last mentioned lamp being positioned in such a way with respect to the support that its flash light is mainly radiated in line with connecting lines of the support to that lamp, the indicator being positioned at that side of the lamp which faces the support.

A flash array of that kind is used for example in flash-photography.

(2) Description of the Prior Art

In a prior art flash array of the kind mentioned above the indicator is a foil which does not conduct the electricity and which, when the combustion flash lamp is ignited, is influenced by the resulting heat radiation, causing it, for example, to shrivel away.

However, a disadvantage of that prior art flash array is that—when the first lamp flashes—a separate switching contact is required to make the circuit of the second lamp to be ignited thereafter ready for ignition. In that respect it should be borne in mind that flash arrays for combustion flash lamps are, as a rule, used for the sequential flashing of the lamps of one lampset only; so that an additional component of the device is even a serious disadvantage.

SUMMARY OF THE INVENTION

It is an object of the invention to keep the total number of components for indication- and switching purposes in a flash array of the type described in the Field of Invention section herein as low as possible.

A flash array according to the invention is provided with a laminar support on which at least two combustion flash lamps have been fitted and in which the support has, at least near one of those lamps, both a hole and a radiation-sensitive indicator of the visual kind indicating whether that lamp has or has not flashed, the last mentioned lamp being positioned in such a way with respect to the support that its flash light is mainly emitted in line with connecting lines of the support to that lamp, and in which the indicator is positioned at that side of the lamp which faces the support, is characterized in that the indicator is designed as a radiation-sensitive switching contact which is part of the electrical circuit of the flash bulb device.

An advantage of this flash array is that one and the same component performs a double function. This relates to the indicator of the visual kind which also functions as electrical switching contact. The number of components of the flash array can therefore be relatively small.

It should be noted that a flash array having a combined melting strip switch/indicator is, in itself, known from, for example, German "Offenlegungsschrift" No. 2,143,220. A disadvantage of this latter known flash array is, however, that it requires reflecting surfaces in the indicator path to enable the indication.

DETAILED DESCRIPTION

The radiation-sensitive switching contact of a flash array according to the invention may, for example, have been designed as a make contact. By the term make contact is to be understood here an electrical circuit contact which, when activated, renders an originally electrically non-conducting trajectory conducting. This make contact may, for example, be connected in series with the second lamp of the flash-array.

In a preferred embodiment of a flash array according to the invention the radiation-sensitive switching contact is a melting break contact, whereby this contact shunts a branch which comprises the second lamp.

An advantage of this preferred embodiment is that with such a melting break contact a reliably operating circuit can be coupled with a qualitative good visual indicator. For, cutting a contact is a less critical matter than making a contact.

The switching contact which functions as indicator might, for example, be arranged between the lamp and the hole in the laminar support. This switching contact might also have been arranged in said hole.

In a further preferred embodiment of a flash array according to the invention, the lamp and the switching contact are arranged on either side of the support.

An advantage of this preferred embodiment is that observing the indicator, which takes place from that side of the support which faces away from the lamp, is very simple. For the observer's eye need not be so close to the extension of the longitudinal axis of the hole in the support.

DESCRIPTION OF A PREFERRED EMBODIMENT

Figures 1, 2:
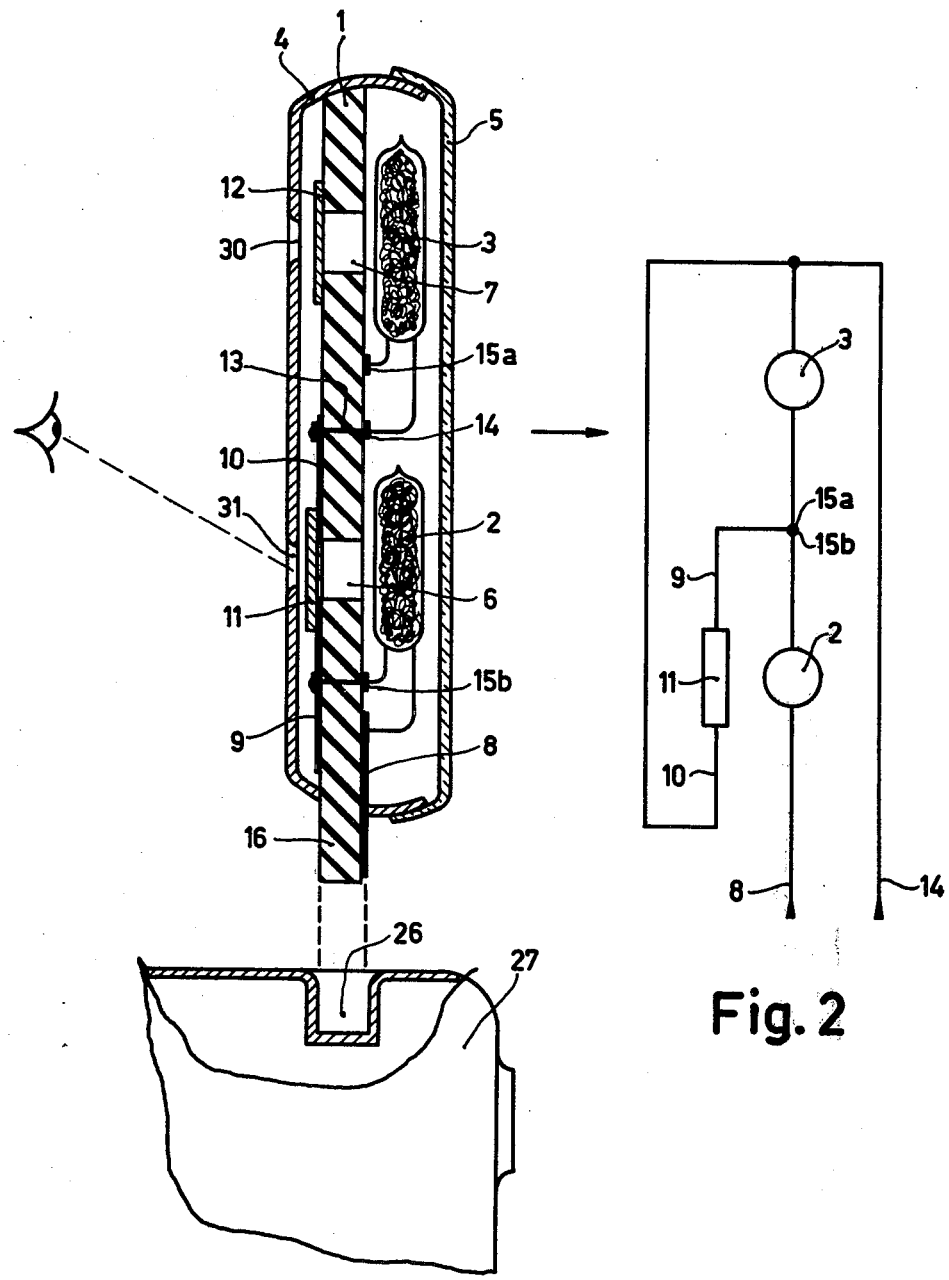
FIG. 1 shows a longitudinal section of a flash array according to the invention as well as a diagrammatical representation of a photo camera on which said flash array can be placed.
FIG. 2 shows the electrical circuit of the flash bulb device of FIG. 1.

In FIG. 1 reference numeral 1 is a laminar support which is designed as a printed conductor board. This board is approximately 1 mm thick. Reference numerals 2 and 3 designate combustion flash lamps which are fitted on the support 1. Reference numeral 4 designates an opaque synthetic casing, which is closed at the lamp side by a transparent cover 5. Near the lamp 2 there is a hole 6 in the support 1. Near the lamp 3 there is a hole 7 in the support 1. Reference numerals 8, 9 and 10 designate copper conductors on the support 1, reference numeral 8 being a supply conductor. The conductors 9 and 10 are located on the side of the support 1 which faces away from the lamp. Reference numerals 11 and 12 designate melting strips. The strip 11 originally forms an electrically conducting connection between the copper conductors 9 and 10. The lamp 2 is connected to the supply conductor 8 and, through a metal griplet, to the copper conductor 9 (see also FIG. 2 for the electrical circuit). The other side of the copper conductor 9 is connected to the conductor 10 through the melting strip 11. Thereafter there is a second metal griplet 13 in the electrical circuit, through which the copper conductor 10 is connected to the lamp 3. This griplet 13 is connected to a copper conductor 14 which leads to an output terminal, on part 16, of the flash bulb device. See also the circuit of FIG. 2. The other side of the lamp 3 is connected to a copper conductor 15a, which is electrically connected to the copper conductor 15b to which the lamp 2 is connected.

The extending part 16 of the support 1 which is provided with the supply conductor 8 can be inserted into the hole 26 of a schematically shown photo camera 27. There the conductors 8 and 14 make contact with conductors, not shown, in the hole 26 of the camera. On flashing, the flash array mainly transmits light into the direction which is indicated in FIG. 1 by means of an arrow. The synthetic casing 4 has been provided with some holes 30 and 31 through which the photographer can observe the strips 12 and 11. In the non-flashed condition of the lamps these strips are present. When the relevant lamp has been flashed the strip is interrupted. Said strips 11 and 12 may, if so desired, have been provided with a couloured coating at the side of the opening 31 or 32 respectively. In an embodiment of the flash array described, the holes 6 and 7 each have a diameter of approximately 5 mm. The strips 11 and 12 are foils consisting of a lead-tin alloy having a thickness of approximately 10 microns and a melting temperature of approximately 190° C. Between the lamp 2 and the support 1 there is—if desired—a reflector. This reflector should be such that the hole 6 is kept free. It is also conceivable that the support—around the hole 6—is provided with a reflecting layer at the lamp side. Light focussing elements—not shown—may also be situated near lamp 3.

The flash array indicated operates as follows. When this array is inserted into the opening 26 of the camera 27 by means of the projection 16, the device is ready for flashing. If, thereafter, the shutter mechanism of the camera is actuated simultaneously an electrical voltage pulse is applied between the terminals 8 and 14 (see FIG. 2). This pulse is derived from a supply source, not shown, in the camera 27. Thereafter the lamp 2 flashes. This causes light to be emitted into the direction indicated by the arrow. Furthermore, owing to the heat development of lamp 2 through the hole 6, heat is supplied to the strip 11 which subsequently melts. Originally this strip 11 constituted a short circuit for the lamp 3. Originally this strip 11 carried the current for the ignition of the lamp 2. Due to the fact that the strip 11 melts the short-circuit of lamp 3 is removed. Furthermore the molten strip 11 now is an indication for the fact that lamp 2 has flashed. Namely, first a coloured strip was visible through the hole 31 which has disappeared after lamp 2 has flashed. This is an indication for the photographer that lamp 2 can no longer be used. However, he sees through the hole 30, that lamp 3 is still available for producing a flash. In the used, flashed, state lamp 2 can pass an electrical pulse. If now the shutter mechanism of the photo camera 27 is again operated, an electrical pulse is again applied between the terminals 8 and 14 of the flash array; thereafter lamp 3 ignites. Light is again emitted into the direction indicated by the arrow and strip 12 also melts. The strip 12 is not part of the electrical circuit for the reason that no further switching actions are required, lamp 3 being the last lamp of the device.

The strip 11, on the contrary, is a strip which both forms an indicator for whether the lamp 2 has or has not flashed and is part of the electrical circuit, see also FIG. 2. Therefore the strip 11 has a double function. Consequently the number of components of the flash array is relatively small.

It is conceivable that a flash array according to the invention comprises more than two lamps.

What is claimed is:

1. A flash array which comprises: a laminar support, at least a first and a second combustion flash lamp carried on a first side of said support, at least one electric conductive circuit connected to said first and second lamps, a radiation-sensitive visual indicator for indicating whether said first lamp has or has not been flashed, and a housing surrounding at least part of said array, said visual indicator being carried on said support, said support having a hole disposed in aligned relationship with said visual indicator and said first lamp, light emitted by said first lamp causing said visual indicator to indicate flashing, said housing having portions which allow visual access to said indicator, said indicator being also a radiation-sensitive switching contact which is connected to said electric conducting circuit to sequentially flash said first and second lamps.

2. A flash array as claimed in claim 1 wherein said radiation-sensitive switching contact is a melting break contact connected in said conducting circuit in shunt relationship to a branch thereof which comprises said second lamp.

3. A flash array as claimed in claim 1 wherein said visual indicator is on the second side of said support.

* * * * *